(12) United States Patent
Vesangi

(10) Patent No.: US 10,565,816 B2
(45) Date of Patent: Feb. 18, 2020

(54) KIOSK LOCATING AND DIRECTING SYSTEM

(71) Applicant: NCR Corporation, Duluth, GA (US)

(72) Inventor: Rajan Babu Vesangi, Hyderabad (IN)

(73) Assignee: NCR Corporation, Atlanta, GA (US)

( * ) Notice: Subject to any disclaimer, the term of this patent is extended or adjusted under 35 U.S.C. 154(b) by 235 days.

(21) Appl. No.: 15/656,374

(22) Filed: Jul. 21, 2017

(65) Prior Publication Data

US 2019/0026973 A1    Jan. 24, 2019

(51) Int. Cl.
| | |
|---|---|
| *G06Q 10/02* | (2012.01) |
| *G07F 9/02* | (2006.01) |
| *G01C 21/20* | (2006.01) |
| *G06Q 20/32* | (2012.01) |
| *G06Q 20/18* | (2012.01) |
| *G06Q 10/00* | (2012.01) |

(52) U.S. Cl.
CPC ............. *G07F 9/026* (2013.01); *G01C 21/20* (2013.01); *G01C 21/206* (2013.01); *G06Q 20/18* (2013.01); *G06Q 20/3224* (2013.01); *G06Q 10/20* (2013.01)

(58) Field of Classification Search
CPC ....... G07F 9/026; G07F 19/20; G01C 21/206; G01S 7/003; G06Q 10/20; G06Q 20/18; G06Q 30/0259; G06T 2207/30108; G06T 19/003

USPC ................. 701/1–2, 300, 400, 434
See application file for complete search history.

(56) References Cited

U.S. PATENT DOCUMENTS

| | | | |
|---|---|---|---|
| 5,984,178 A * | 11/1999 | Gill ................... | G06Q 20/1085 235/376 |
| 9,342,963 B1 * | 5/2016 | McGraw, IV ........... | G07F 19/00 |
| 2002/0002467 A1 * | 1/2002 | Ho ..................... | G01C 21/3644 705/323 |
| 2006/0247849 A1 * | 11/2006 | Mohsini ................ | G01C 21/20 701/434 |
| 2013/0191246 A1 * | 7/2013 | Calman .............. | G06Q 30/0639 705/26.9 |

* cited by examiner

*Primary Examiner* — Dalena Tran
(74) *Attorney, Agent, or Firm* — Schwegman, Lundberg & Woessner

(57) ABSTRACT

Various embodiments herein each include at least one of systems, devices, software, and methods for kiosk locating and directing. One such method embodiment, as may be performed on a server, includes receiving a notification from a kiosk system of an out-of-service condition and an identifier of the kiosk system from which the notification is received. This method further includes identifying a location of the kiosk system and transmitting the location of the kiosk system to a wayfinding application of a technician.

20 Claims, 4 Drawing Sheets

KIOSK LOCATING AND DIRECTING SYSTEM

BACKGROUND INFORMATION

Self-service kiosks, such as Automated Teller Machines (ATM), airline check-in and boarding pass printing terminals, self-service checkouts (SSCO), and the like, eventually need maintenance. However, such kiosks are often deployed in a distributed manner in a large facility, such as an airport terminal or shopping mall. At the same time, technicians that service such kiosks have interchangeable skills and are commonly assigned in a round-robin manner. As a result, kiosks can be difficult to locate in a large facility by technicians that are not familiar with the facility. Further, isolating the particular kiosk in need of service can be challenging as there are often large banks of kiosks deployed in close proximity (e.g., a store checkout area, an airline ticketing area, ATMs deployed at a bank).

SUMMARY

Various embodiments herein each include at least one of systems, devices, software, and methods for kiosk locating and directing.

One such method embodiment, as may be performed on a server, includes receiving a notification from a kiosk system of an out-of-service condition and an identifier of the kiosk system from which the notification is received. This method further includes identifying a location of the kiosk system and transmitting the location of the kiosk system to a wayfinding application of a technician.

Another method embodiment that may be performed on a server includes receiving a notification from a kiosk system of an out-of-service condition and transmitting an identifier of the kiosk system and a representation of the notification of the out-of-service condition to a messaging account of a technician.

A further embodiment, in the form of a server system, includes at least one network interface, at least one processor, and at least one memory storing instructions executable by the at least one processor to perform data processing activities. The data processing activities may include receiving, via the at least one network interface, a notification from a kiosk system of an out-of-service condition, the notification including at least one state identifier giving rise to the out-of-service condition. The data processing activities may further include transmitting, via the at least one network interface device, an identifier of the kiosk system and a representation of the notification of the out-of-service condition to a messaging account of a technician.

BRIEF DESCRIPTION OF IRE DRAWINGS

DETAILED DESCRIPTION

Figure 1:
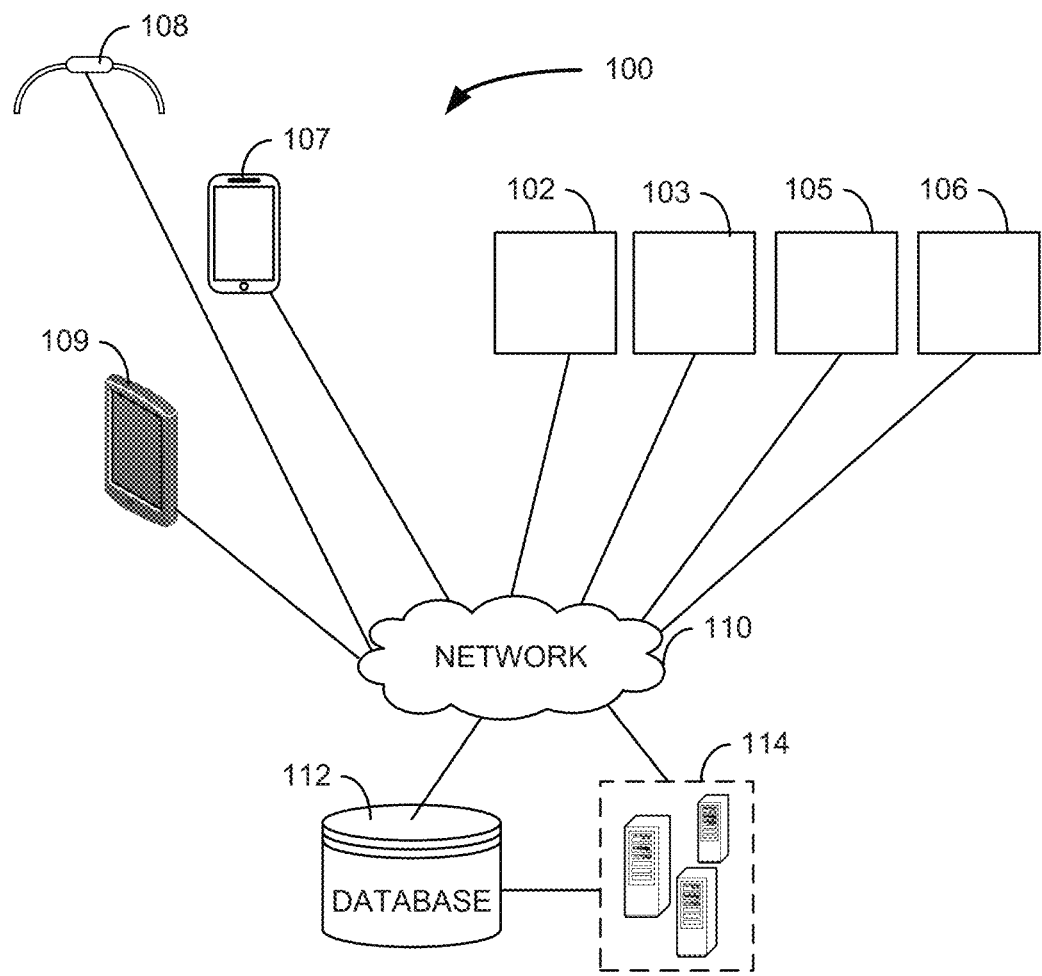
FIG. 1 is a logical block diagram of a system architecture, according to an example embodiment.

Various embodiments herein each include at least one of systems, devices, software, and methods for kiosk locating and directing. Some such embodiments include solutions whereby a kiosk system, such as an ATM, SSCO, airline check-in and boarding pass printing terminal, and the like may detect an out of service or need of service condition. Such conditions may arise and be detected in various ways, such as a detected tampering event, a low or depleted supply of a media type (e.g., printer paper, currency), and the like. A process or a dedicated device may then transmit a notification over a network, such as the Internet, to a terminal management system. The terminal management system may then identify a location of the notifying terminal and identify a technician that can service the terminal. Identifying the technician may include taking into a location of a technician in close or closest proximity and other factors, such as availability, skills to address one or more fault conditions on the terminal, and the like. The terminal management system may then transmit a notification to a mobile device app of the identified technician that may be used for several functions including wayfinding to the terminal, assigned work queue viewing, review, and updating, and other functions. One function may include an ability to cause a message to be sent or redirected to the terminal to activate an attraction feature, such as one or more of a light and an audible signal, to assist the technician in identifying the terminal amongst a plurality of terminals at a particular location.

In such embodiments, the assignment processes is essentially automatic, absent human intervention, as terminals are able to identify fault conditions and send the notification of the terminal management system. The terminal management system is able to then automatically assign the terminal and the fault to a technician based on known attributes of technicians, which may include assignment based on technician location as updated by the technician mobile device apps.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 architecture, according to an example embodiment. The system 100 is an example of a system on which some embodiments may be deployed.

The system 100 includes a plurality of terminals 102, 103, 105, 106 may include one or more types of terminals. The types of the terminals 102, 103, 105, 106 may include one or more of ATMs, SSCOs, library checkout stations, customer assistance kiosks, airline boarding pass airline check-in and boarding pass printing terminal, and the like. The terminals 102, 103, 105, 106 may be deployed to a single location, in multiple locations in a single facility, in multiple facilities, and otherwise. Thus, the terminals 102, 103, 105, 106, although illustrated together, may be greatly disbursed.

The terminals 102, 103, 105, 106 are each connected to at least one network 110. The network 110 may be the Internet, a dedicated security-hardened network, or other network.

Also connected to the network 110 is a terminal management system 114. The terminal management system 114 may include, may be connected to, or may otherwise communicate with a database 112. The terminal management system 114 includes processes that execute thereon to perform many functions associated with operation and management of the terminals 102, 103, 105, 106 and coordination of technicians.

The system 100 further includes mobile devices 107, 108, 109 that are carried by technicians and communicate with the terminal management system 114 over the network 110. The mobile devices 107, 108, 109 may include devices in essentially any form that are able to communicate data over the network and execute an app to present data to a technician and report certain data and other information to the terminal management system 114. The mobile devices 107, 108, 109, in some embodiments, include smartphones 107, smartwatches 108, tablets 109, portable/laptop computers, in-vehicle controllers/computing systems, and the like. However, in some embodiments, rather than a mobile device, the same or similar functionality may be provided, in whole or in part, by the terminal management system 114 via a browser-based solution.

The database 112 may store data with regard to each terminal 102, 103, 105, 106 including locations to which they are deployed. The database 112 may also store map data of the area of the locations to which the terminals 102, 103, 105, 106 are deployed, which may include facility maps, such as maps of shopping centers, transportation terminals, libraries, and the like. These maps are generally presentable in electronic form on a technician mobile device 107, 108, 109. The maps may also include metadata that allows for a location of a terminal 102, 103, 105, 106 to be plotted and displayed thereon to assist in guiding a technician to a terminal in need of service.

The database 112 may also store data representative of each technician, which may also include representations of geographic locations thereof based on location coordinates (GPS) reported to the terminal management system 114 by the app that executes on each technician mobile device 107, 108, 109. The database 112 for each technician may additionally include a representation of one or more of skills, capabilities, tools, and supplies of or possessed by the technicians.

In operation, the terminal management system 114 may receive notifications from a terminals 102, 103, 105, 106 of a fault condition, identify technicians in the vicinity of the terminal, determine which of the identified technicians has skills, tools, and supplies that may be needed to service the terminal 102, 103, 105, 106, and assign a technician to the task. The terminal management system 114 may then retrieve one or more maps from the database 112 that may be useful to the assigned technician to locate the terminal. The terminal 102, 103, 105, 106 location, information with regard to the fault condition, the location of the terminal 102, 103, 105, 106, and the one or more retrieved maps are then transmitted to or queue for retrieval by the mobile device 107, 108, 109 app of the assigned technician. The app may then present information about the terminal, one or more of the maps with a plotted location of the terminal 102, 103, 105, 106, and a plotted current location of the mobile device 107, 108, 109, FIG. 2 provides an example of such a map.

Figure 2:
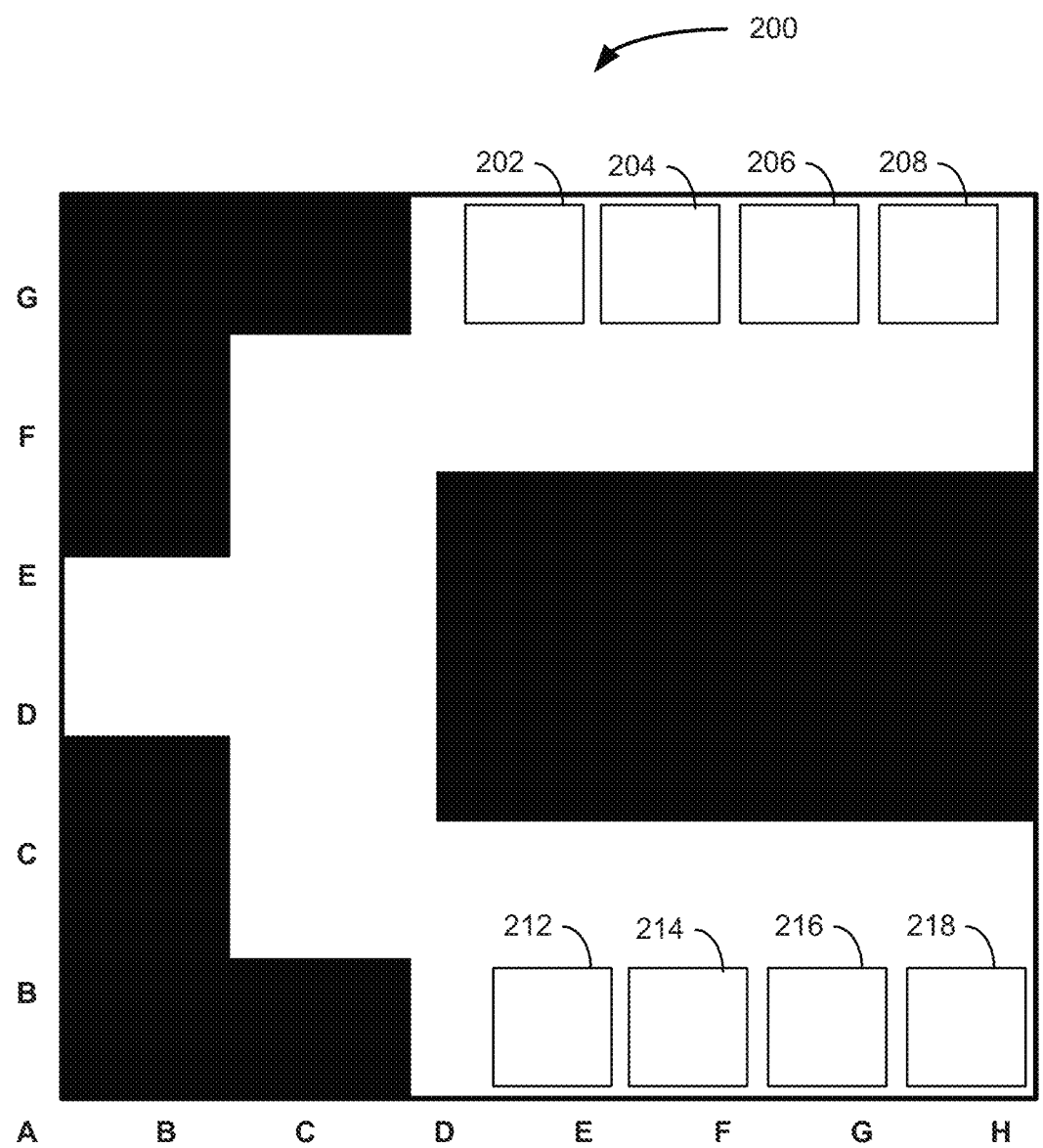
FIG. 2 is a map illustration that may be presented to assist in directing service to a kiosk device, according to an example embodiment.

In particular, FIG. 2 is a map 200 illustration that may be presented to assist in directing service to a kiosk device, according to an example embodiment. As illustrated, the map 200 includes an upper bank of kiosk systems 202, 204, 206, 208 and a lower bank of kiosk systems 212, 214, 216, 218. The upper and lower banks of kiosk systems are illustrated in different hallways or wings of a facility. As such, the map 200 may be useful, even needed in some instances, to help a technician locate a kiosk system in need of service. Note that the map 200 includes a lettered grid system on the lower and left sides to allow for plotting of markers on the map 200. These makers may be of a kiosk in need of service and a current location of a technician viewing the map 200 within an app of a mobile device.

Figure 3:
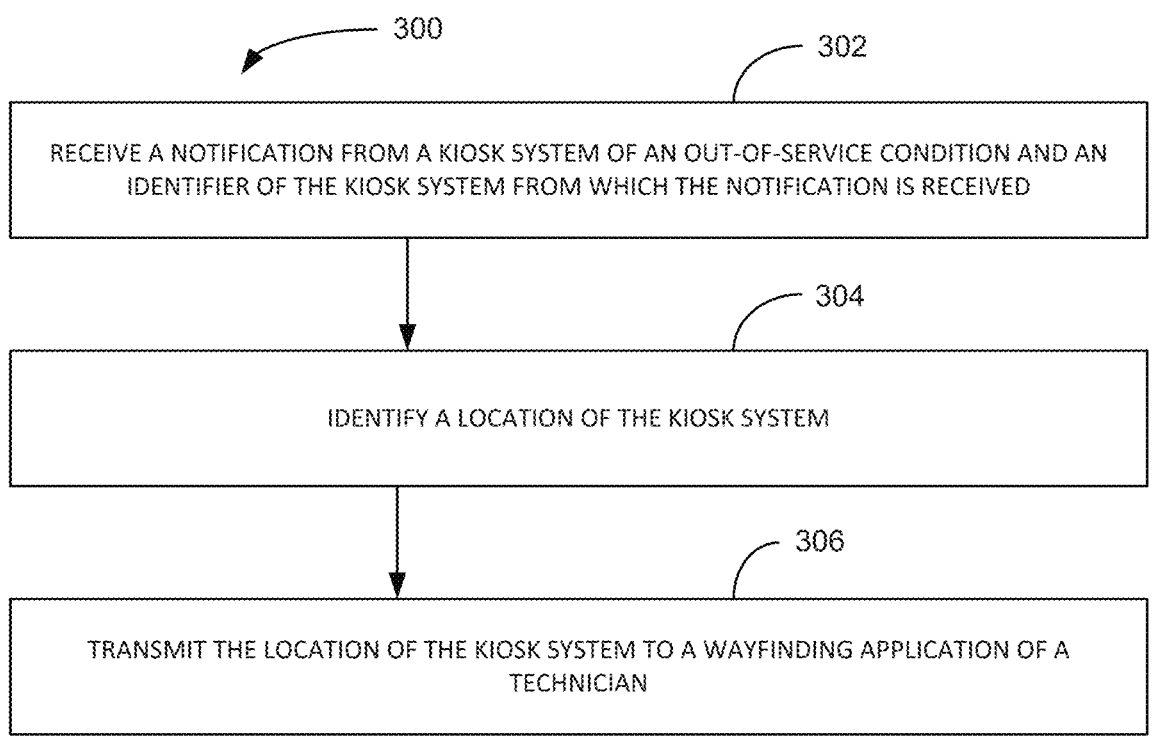
FIG. 3 is a block flow diagram of a method, according to an example embodiment.

FIG. 3 is a block flow diagram of a method 300, according to an example embodiment. The method 300 is an example of a method that may be a terminal management system process, such as may be performed by the terminal management system 114 of FIG. 1.

The method 300 includes receiving 302 a notification from a kiosk system of an out-of-service condition and an identifier of the kiosk system from which the notification is received. The method 300 may then identify 304 a location of the kiosk system and transmit 306 the location of the kiosk system to a wayfinding application of a technician. In some embodiments, the notification received 302 from the kiosk system includes at least one state identifier giving rise to the out-of-service condition.

In some embodiments, the method 300 further includes retrieving map data based on at least the identified location of the kiosk system. In some such embodiments, transmitting 306 the location of the kiosk system to the wayfinding application of the technician includes transmitting the retrieved map data. Retrieving the map data may include retrieving a map renderable by the wayfinding application of the technician. The renderable map in some embodiments addressable according to position coordinates (e.g., map 200 of FIG. 2). In some further embodiments, transmitting 306 the location of the kiosk system to the wayfinding application of the technician further includes transmitting coordinates of the kiosk system that are to be plotted on the renderable map.

In another embodiment, the method 300 further includes receiving periodic location data updates from the wayfinding application of the technician identifying a location of the technician. Such embodiments may then store the location data updates in association with a data representation of the technician along with location data updates stored in association with respective other technicians. The method 300, in such embodiments, may further include identifying the technician to the wayfinding application of which the location of the kiosk system is to be transmitted based on the identified location of the kiosk system in view of the stored location data of the technicians.

Yet another embodiment of the method 300 further includes receiving a request from the wayfinding application of the technician to activate an attract function of the kiosk system and transmitting a command to the kiosk system to activate a attract function of the kiosk system. The attract function of the kiosk system, in some embodiments, includes a visual indicator that illuminates to identify the kiosk system to the technician.

Figure 4:
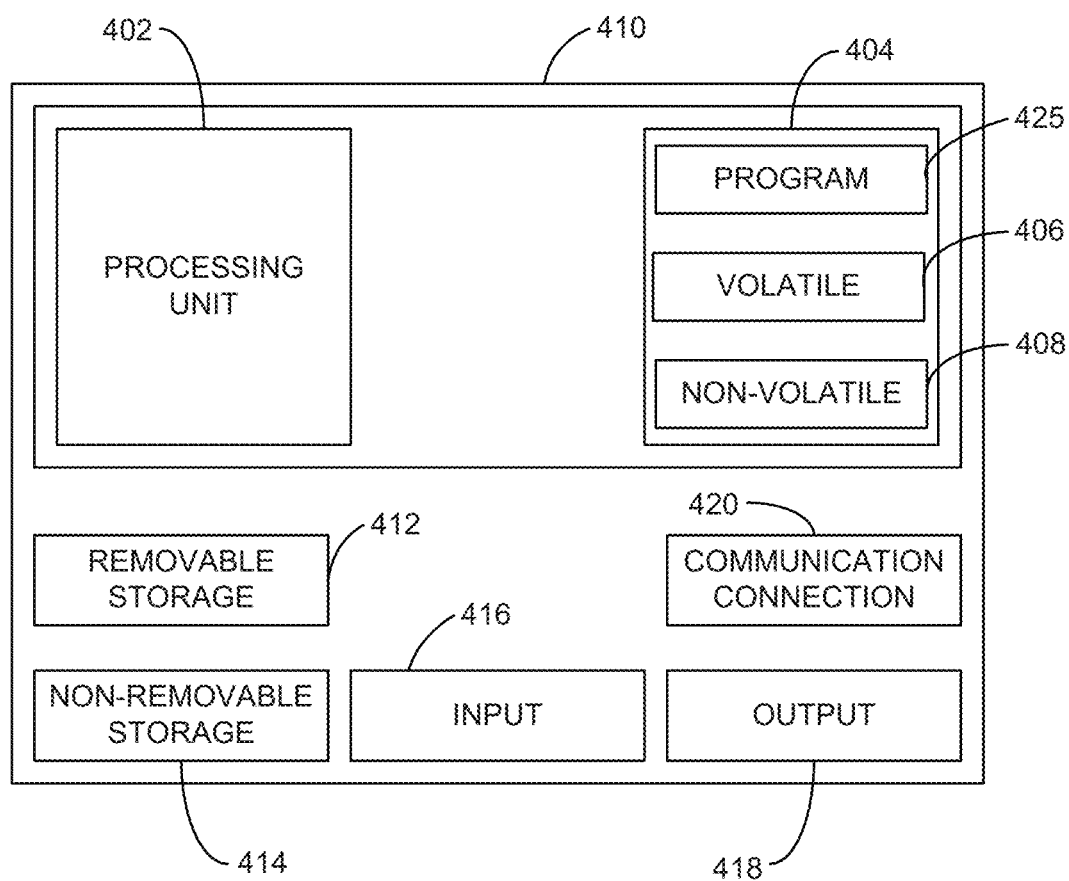
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims,

What is claimed is:

1. A method comprising:
receiving a notification from a kiosk system of an out-of-service condition and an identifier of the kiosk system from which the notification is received,
identifying a location of the kiosk system; and
transmitting the location of the kiosk system to a wayfinding application of a technician selected based at least in part on a skillset of the technician represented in stored data from a plurality of technicians having skillsets represented in the stored data.

2. The method of claim 1, wherein the notification received from the kiosk system includes at least one state identifier giving rise to the out-of-service condition.

3. The method of claim 1, further comprising:
retrieving map data based on at least the identified location of the kiosk system; and
wherein transmitting the location of the kiosk system to the wayfinding application of the technician includes transmitting the retrieved map data.

4. The method of claim 3, wherein:
retrieving the map data includes retrieving a map renderable by the wayfinding application of the technician,
the renderable map is addressable according to position coordinates; and
transmitting the location of the kiosk system to the wayfinding application of the technician further includes transmitting coordinates of the kiosk system that are to be plotted on the renderable map.

5. The method of claim 1, further comprising:
receiving periodic location data updates from the wayfinding application of the technician identifying a location of the technician,
storing the location data updates in association with a data representation of the technician along with location data updates stored in association with respective other technicians; and identifying the technician to the wayfinding application of which the location of the kiosk system is to be transmitted based on the identified location of the kiosk system in view of the stored location data of the technicians.

6. The method of claim 1, further comprising:
receiving a request from the wayfinding application of the technician to activate an attract function of the kiosk system, and
transmitting a command to the kiosk system to activate a attract function of the kiosk system.

7. The method of 6, wherein the attract function of the kiosk system includes a visual indicator that illuminates to identify the kiosk system to the technician.

8. The method of claim 1, wherein the wayfinding application is a mobile device app that executes on a mobile device of the technician.

9. A method comprising:
receiving a notification from a kiosk system of an out-of-service condition; and
transmitting an identifier of the kiosk system and a representation of the notification of the out-of-service condition to a messaging account of a technician selected based at least in part on a skillset of the technician represented in stored data from a plurality of technicians having skillsets represented in the stored data.

10. The method of claim 9, wherein the notification received from the kiosk system includes at least one state identifier giving rise to the out-of-service condition.

11. The method of claim 9, further comprising:
retrieving map data based on at least a location of the kiosk system; and
wherein transmitting the identifier of the kiosk system and the representation of the notification of the out-of-service condition to the messaging account of the technician includes transmitting the retrieved map data.

12. The method of claim 11, wherein:
retrieving the map data includes retrieving a map renderable by a mobile device app that executes on a mobile device of the technician, and
the renderable map is addressable according to position coordinates.

13. The method of claim 12, further comprising:
retrieving position coordinates of the kiosk system based on the identifier of the kiosk system; and
transmitting the retrieved position coordinates of the kiosk system to the messaging account of the technician, the position coordinates enabling plotting of the location of the kiosk system on the renderable map.

14. The method of claim 9, wherein the messaging account of the technician is accessed by a mobile device app that executes on a mobile device of the technician, the method further comprising:
receiving periodic location data updates from the mobile device app of the technician identifying a location of the technician,
storing the location data updates in association with a data representation of the technician along with location data updates stored in association with respective other technicians; and
identifying the technician of the mobile device app to which the identifier of the kiosk system is to be transmitted based on a location of the kiosk system in view of the stored location data of the technicians.

15. The method of claim 14, further comprising:
receiving a request from the mobile device app of the technician to activate an attract function of the kiosk system; and
transmitting a command to the kiosk system to activate a attract function of the kiosk system.

16. The method of 15, wherein the attract function of the kiosk system includes a visual indicator that illuminates to identify the kiosk system to the technician.

17. A system comprising:
at least one network interface;
at least one processor;
at least one memory storing instructions executable by the at least one processor to perform data processing activities comprising:
receiving, via the at least one network interface, a notification from a kiosk system of an out-of-service condition, the notification including at least one state identifier giving rise to the out-of-service condition; and
transmitting, via the at least one network interface device, an identifier of the kiosk system and a representation of the notification of the out-of-service condition to a messaging account of a technician selected based at least in part on a skillset of the technician represented in stored data from a plurality of technicians having skillsets represented in the stored data.

18. The system of claim 17, the data processing activities further comprising:
retrieving map data from a database based on at least a location of the kiosk system; and
wherein transmitting the identifier of the kiosk system and the representation of the notification of the out-of-service condition to the messaging account of the technician includes transmitting the retrieved map data.

19. The system of claim 18, wherein:
retrieving the map data includes retrieving a map renderable by a mobile device app that executes on a mobile device of the technician, and
the renderable map is addressable according to position coordinates.

20. The system of claim 19, further comprising:
retrieving position coordinates of the kiosk system from the database based on the identifier of the kiosk system; and
transmitting, via the at least one network interface device, the retrieved position coordinates of the kiosk system to the messaging account of the technician, the position coordinates enabling plotting of the location of the kiosk system on the renderable map.

* * * * *